United States Patent [19]
Kalik et al.

[11] Patent Number: 5,326,269
[45] Date of Patent: Jul. 5, 1994

[54] SCRAMBLE-CIRCUITED QUIZ-MODULE W/OVERLAYING Q&A-SHEETS

[76] Inventors: Maurice S. Kalik; Azril O. Kalik, both of Box 7594, Chula Vista, Calif. 91912

[21] Appl. No.: 59,574

[22] Filed: May 12, 1993

[51] Int. Cl.$^5$ .................................................. G09B 7/10
[52] U.S. Cl. ..................................... 434/338; 273/431
[58] Field of Search ................ 434/338; 273/430, 431, 273/432

[56] References Cited

U.S. PATENT DOCUMENTS

| | | | |
|---|---|---|---|
| 1,860,895 | 5/1932 | Marx | 434/338 |
| 2,198,894 | 4/1940 | Werner | 434/338 |
| 2,586,710 | 2/1952 | Pick | 434/338 |
| 2,627,672 | 2/1953 | Polton | 434/338 |
| 3,106,784 | 10/1963 | Raley | 434/338 |
| 3,504,448 | 4/1970 | Moore | 434/340 |
| 3,559,304 | 2/1971 | Kane | 434/340 |
| 3,561,136 | 2/1971 | Solow | 434/338 |
| 3,600,824 | 8/1971 | Robinson | 434/335 |
| 3,608,209 | 9/1971 | Schnelle | 434/340 |
| 3,699,668 | 10/1972 | Tesar | 434/340 |
| 3,763,574 | 10/1973 | Rose | 434/339 |
| 4,069,597 | 1/1978 | Bigorre | 434/340 |
| 4,121,355 | 10/1978 | Kimoto | 434/340 |
| 4,802,092 | 1/1989 | Harte | 364/411 |

FOREIGN PATENT DOCUMENTS 849024  9/1952  Fed. Rep. of Germany ...... 434/338

Primary Examiner—William H. Grieb
Attorney, Agent, or Firm—Inventech Co.

[57] ABSTRACT

An improved quiz-game like educational apparatus, exhibiting entertainment-value qualities suitable for one or more players of virtually all ages, via a reference-library of subjects. A thin planar 6½"×10" housing, contains an elementary hard-wired or printed electrical-circuit, powered by a harmless drycell-battery. The operating panel is vertically divided into discrete question-terminals on the left, correspondingly scrambled answer-terminals on the right; preferably including at least one supernumerary answer-terminal, making selection more improbable as to obviousness when approaching the last question. The panel preferably includes a special off/on-switch, having more than one 'on'-position in order to further confound a player as to learned sequence familarity of Q&A-terminals; each Q&A/overlay-sheet forcing the protruding switch slide-stalk to be indexed into a different circuit-scramble. A normally-off telltale-light or audio-signal activates, when a correct answer matches-up to the question addressed to player via a pair of panel continuity-leads internally wired to complete a circuit to the lamp when correct answer is made; competative-players being aided in question selection via a simple spin-dial.

11 Claims, 1 Drawing Sheet

U.S. Patent     July 5, 1994     5,326,269
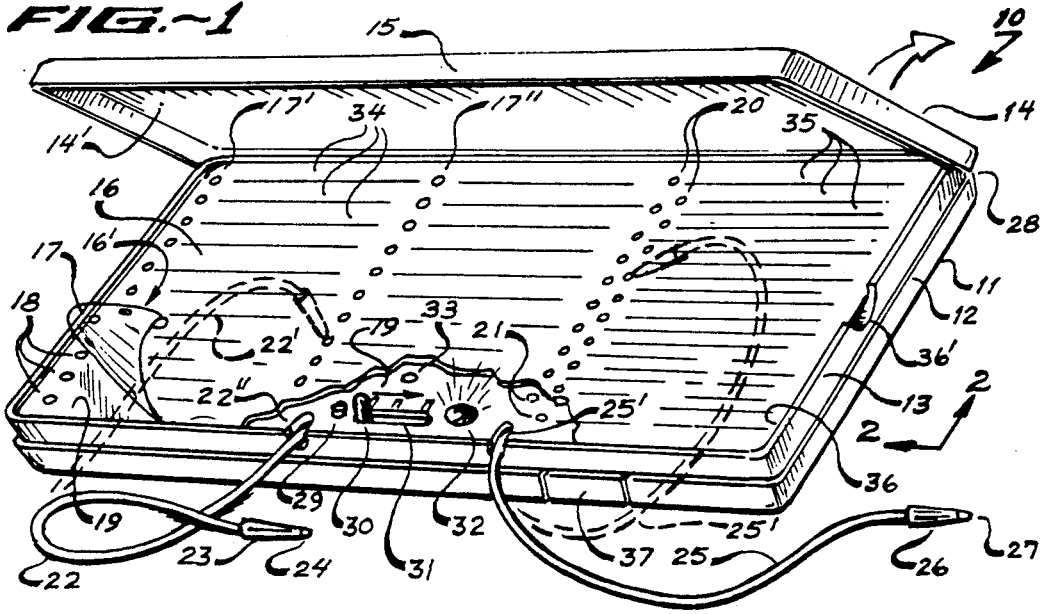
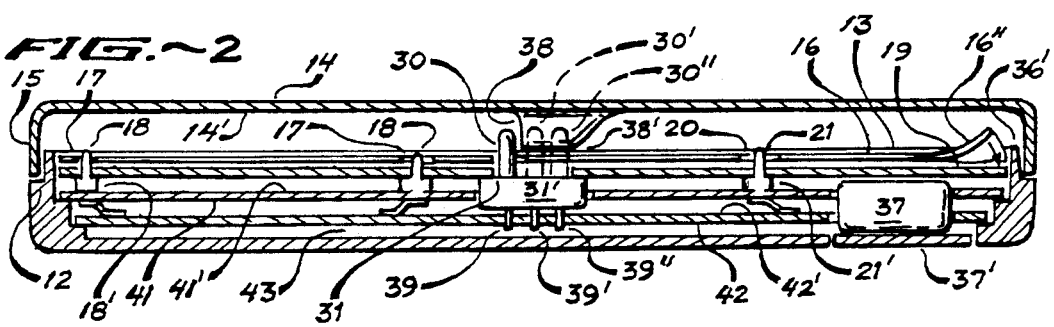
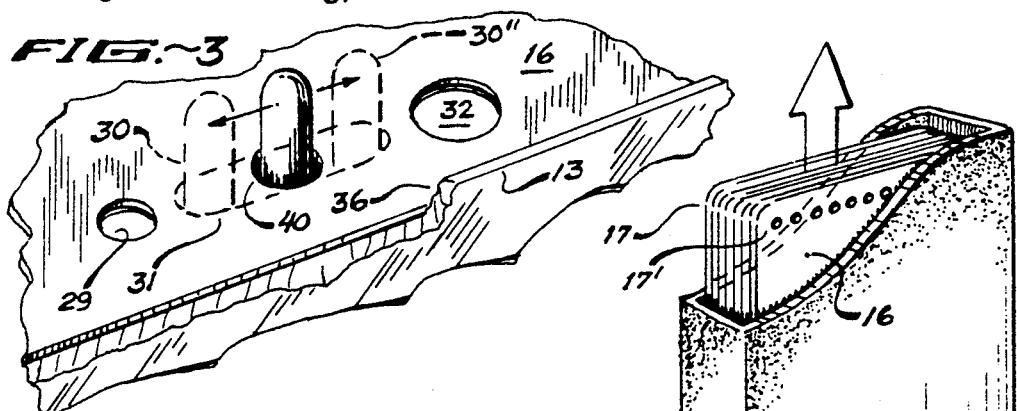
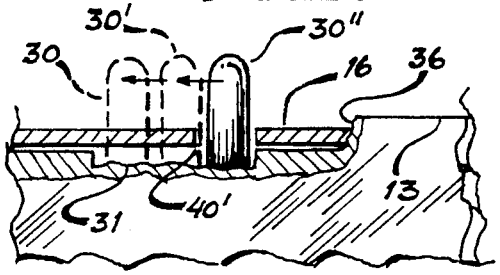

SCRAMBLE-CIRCUITED QUIZ-MODULE W/OVERLAYING Q&A-SHEETS

PROBLEMATICAL BACKGROUND OF RELEVANT EARLIER INVENTION

This invention relates to improvements for educational question & answer games, and more specifically it relates to those types of Q&A-games which comprise a series of open contact-circuits which are electrically completed via manual selection response from a roster of multipul-choice candidate Q&A specimens, whereby the correct answer elicits some manner of "right"-indication.

Heretofore, efforts by inventors to create a truly workable Q&A-game have been varied and not always user friendly. Background research discovery provides some prior patent-art regarded as germane to this disclosure, for example in U.S. Pat. No. 3,504,448 (filed April 1968), the inventor shows a planar electrical-panel surface exhibiting an array of L-shaped alignment-frames for receiving different Q&A-cards having questions on both front and rear sides. A plurality of electrical-contacts is included within a grooved portion of the L-frame, thereby facilitating bridging of only two contacts thereto when cards are inserted, by means of an indexing-conductor integrally formed with the Q&A-card. Corresponding to each card position is an answer selection-button, and an illuminated answer-indicator lamp; while no manually held electrical-probes are employed.

Next, and more germane, U.S. Pat. No. 3,561,136 (filed June, 1968) shows a planar panel also having an L-shaped abutment edging acting to index-position an overlay-card having integrally imprinted electrical-conductor terminals for both the questions and the answers. The user first selects and places a Q&A/overlay-card upon the platen-surface, which includes a plurality of electrical-conductor terminals aligning with the plurality of card-terminals; thereby ostensibly completing electrical-circuiting on the face of the card, as though it were a direct part of the electrical-panel. Additionally, two discrete non-insulated hand-held electrical-probes are provided, by which the user is to apply upon the card-terminals user believes correspond to the correctly matching Q&A's. If a correct selection is executed, a "right"-light activates; however, if an erroneous selection is obtained the user receives an instantaneous harmless electrical-shock. While the inventor contended the system would inforce a positive Pavlovian-learning process, the public is not believed to have taken well to the notion of electrical punishment, the invention remaining obscure.

U.S. Pat. No. 3,559,304 (filed-June, 1968) shows a classroom Q&A-testing apparatus to be employed in conjunction with existing class-workbooks of a non-electrical nature; whereby is provided an additional spiral-bound notepad having disposable testing sheets, the top most one of which is positioned immediately adjacent to the workbook having the list of questions. The answer-sheets each include a printed-circuit upon its underside, and a needle-like conductive-probe is manually inserted into the top-surface region containing selectable indicia, whereby an electrical circuit is completed if properly answered.

U.S. Pat. No. 3,600,824 (filed July, 1971) shows another planar electric-panel employing a Q&A-card having a printed-circuit on its backside interfacing with two terminals exposed at the panel's top-surface. A question-selector is slidable to stop at one of a plurality of numbered stations, whereby the user may press answering-buttons A,B,C,D, which will illuminate either a "correct" or "incorrect" lamp.

U.S. Pat. No. 3,608,209 (filed October, 1969 via Germany) shows another planar electric-panel which is designed to employ a series of differently shaped playing-blocks, ostensibly serving to overcome the factor of possible predictability found in some Q&A-apparatus. However, the use of the blocks spoils the simplicity being endeavored by the basic notion of employing Q&A-cards for educational purposes at all levels. More interestingly, the text contains reference to a German-patent #849,024, disclosing a electrical-panel having questions at the left and selectable scrampled-answers at the right. An electrical question-jack is first inserted, then a answer-jack is inserted, thereby illuminating a "right"-light illuminates if the selection is correct; by virtue of having completed an internal normally-open circuit. The inventor explaining that this sort of apparatus becomes simply to predictable, once the user has completed a couple of sessions, and learns the scrambled order of fixed circuiting. U.S. Pat. No. 3,699,668 (filed February, 1971) shows an electrical-panel, having a series of pushbuttons over which is laid a special Q&A-card; whereupon the user is challenged to determine which overlaying answer is the correct one. Pressing of the square containing the correct answer, depresses a metalic-conductor imprinted upon the rear, thereby completing an open-circuit and illuminating a "right"-indicator.

U.S. Pat. No. 3,763,574 (filed March, 1972) shows a planar electronic-panel having a maze-like printed-circuit display surface, which combines alternating closely-spaced electrical-conductors which constitutes an open-circuit. An assortment of overlay-cards are provided, each of which carries a metalic-imprint spot on it's backside directly opposite to a correct-answer space shown on its viewing-side. Thus, pressing the wrong-answer spot on the viewing-side evokes no response, while pressing the correct one, acts to complete the open-circuit activating a "right"-signal.

U.S. Pat. No. 4,069,597 (filed April, 1976 via France) shows a planar electronic-panel divided into a Q&A-section, and an array of adjacent response contact-terminals made to receive manual placement of a small conductive stud-plug, of which there are several. Thus, the user is required to make their selection of a selected answer, by placing a stud-plug upon a corresponding terminal; which if correct, acts to illuminate a "right"-indicator.

U.S. Pat. No. 4,121,355 (filed October, 1978 via Japan) shows another maze-like zigzaged printed-circuit matrix applied to the planar surface of an electronic-panel, while the different Q&A-cards include aproximate ¼-inch holes which permit insertion of a special carbon-impregnated rubber-stylus acting to bridge a gap between neg./pos. exposed conductors of the maze beneath. A correctly selected answer thus completes an open-circuit, activating a "right"-indicator.

In U.S. Pat. No. 4,802,092 (filed January 1985) shows a relatively sophisticated electronic-panel apparatus for quizzing purposes, including a planar top-surface having four corner-indexes serving to alignably position an overlay-card having printed Q&A-indicia, plus response areas adjacent to each answer choice. With a Q&A-card overlayed, and having read the first question, one need only direct an electronic-probe thereover, causing one of the indicated sensory-zones underlaying the two-layered conductor-matrix to inductively respond in terms of electromotive resistance, if the selected response is determined to be correct. While this final invention is durable and easy to use, it employs state-fo-the-art electronics far beyond the purview of the instant invention hereof; as shall be explained.

Therefore, having reviewed the most relevant patent-art, asserts that there is a need for a simple Q&A-apparatus which overcomes the difficulties of such earlier inventions. Accordingly, the inventor hereof has set out to produce this improved device presently identified as the FIREFLY TM Q&A-game, under the auspices of Kalik-Mfg./Mkt.Co., San Diego, Calif.

II.) SUMMARY OF THE INVENTION

A. In view of the foregoing discussion about the earlier invention art, it is therefore important to make it pellucid to others interested in the art that the object of this invention is to provide an improved planar electric-panel learning-device, of the type discretely divided into separate left-side/questions and right-side/answers (or, likewise true/false formatting); which can be at once educational and entertaining, at relatively nominal cost, the only maintenance being that of occassional battery renewal.

B. Another object of this invention is to set forth a Q&A-device having twin flexible A&B/electrical-conductors with blunt tip-probes, extending from the electric-panel; the conductors preferably being suitably insulated for holding in opposite hands, so that one or more operators may proceed to exercise turns in determining a correct answer to a given question. Optionally including a random question-selector device such as a simple spin-dial, if it is preferred to take questions out of their normal sequence order. The hand selector-probes being employed to conductively either contact or plug-in to Q&A-terminals presented upon the operating panel; thereby completing a normally-open electrical-circuit for each adjacently displayed question, only if the correct terminal and it's adjacent answer is selected.

C. Another object of this invention is to set forth a simple Q&A-device wherein the electrical panel-terminals may be either hard-wired beneath the panel surface; or more preferably, circuited via the well known printed-circuit manner, wherein a single printed-circuit employing commonly known bridging technique, in order that a plurality of circuit conductors (generally ten to twenty) be circuitously routed from their appointed O-terminal to their appropriate A-terminal in discrete manner. Moreover, it is desired that a well scrambled order be employed; that is, that the numerical progression exhibited at the left question-roster of questions, be as improbably juxtaposed in order at the right answer-roster, thereby making guess work problematical. Furthermore, it is desired that an additional supernumerary be included at the answer-roster, that in order that guess-work be made even more problematical.

D. Another object of this invention is to set forth a Q&A-device according to the preceding criteria, wherein is provided a convenient on/off-switch, preferably with a tiny LED/pilot-light serving as an indicator the game is activated, and as a standby reminder to switch-off after a challenging playing-session is over. Additionally, it is preferred that the electrical-switch include a second, and even third on-position, whereby a still more complexedly scrambled selection of Q&A-terminal juxtapositions are provided; thereby still further confounding any possibility of answer predictability simply by virtue of one's learning familiarity as to the positional order relationship of the Q&A-terminals.

E. Another object of this invention is to set forth a Q&A-device as set forth above, whereby in lieu of a previously mentioned standby LED/pilot-light, a special cover-lid is provided which cannot be completely closed until the said on/off switch is fully biased to the "off"-position. This is achieved by provision of a simple blocking-occlusion built-in the panel-lid, which effectively obstructs the final downward hinging action; hence, defeating the otherwise normal final travel of the lid-clasp relative to the panel-clasp. Additionally, it is desired to provide a separate access-cover for the operating battery, which is preferably of the 9-volt type having standardized male/female snap-on terminals thereto; which is most easily wired into the circuitry, without need of a battery-compartment having more complex contact terminal arrangement.

F. Another object of this invention is to set forth a Q&A-device according to the above items: A–E, wherein is included a special Q&A-card, which may be inexpensively and durably made of cardboard, plastized-paper, calendered or laminated-paper, or flexile plastic. This card is made free of any electrical-conductors, by virtue of its having a plurality of simpler die-cut aperatures made through the card-surface, so that the earlier mentioned handheld conductor-probes may simply impinge directly upon the panel-terminals aligned thereunder; thereby eliminating the problem of dirt and grime deteriorating electrical-contacts employed in conjunction with special conductive-cards. Still another optional feature of the Q&A-card employed herewith, resides in the preferred provision of blank-cards having lined spaces wherein a parent or teacher may fill-in the blanks with their own questions and answers, even thereupon readily photocopying from the master-copy on a custom basis, any number of such questionaires; for more efficient and flexible classroom procedure directly addressing the teachers own curriculum.

G. Another object of this invention is to set forth a Q&A-gameboard, whereby the matching of an array of questions each to their respective correct answers acts to flash or illuminate a light or audible signal. Intended for ages four and above, the preferred $6\frac{1}{2}"\times10"$ panel-face format preferably exhibits a matrix of some twenty Q&A-terminals both at the left portion and at the right portion outboard margins respectively. The body of the electric-panel is to be preferably about an inch-thick, plus the covering lid will include sufficient an air-space as to facilitate stowing of the associated hand-held pencil-like electrical-conductors. The top of the panel is designed to accept a single Q&A-card, and is necessarily index-aligned into operational position, either via electrical-terminals which simply protrude through holes immediately adjacent to the respective question and answer text; or, via at least partial frame-like perimeter-edging holding the Q&A-card response-aperatures over the respective panel-terminals. Accordingly, the questions and their correct answers are always lithoprinted or silkscreened in the same pattern as the associated electrical Q&A-terminals are circuited, so that a correct answer always evokes activation of the "right"-light (or equivalent rewarding response). In most cases, such as those units for retail-store purchase by the public, a basic set of Q&A-cards is to be provided with each FireFly ™ Q&A-device. Additional sets of Q&A-cards addressing specific general education learning-aid topics such as: Arithmetic-computations, American-history, Famous-authors, Real-estate license, Noted-inventors, Archaeology, Zoology, Object-spelling, etc., will be carried by the retailer, so that the purchaser can return from time to time and expand their library of educational Q&A-cards. These cards can also be tailored to address pertinent topics to be found in noted national publications such as National-Geographic magazine, or reference books such as Encyclopedia-Americana, or textbooks.

H. Another object of this invention is to set forth a Q&A-gameboard which fulfills the need for an educational-game/toy which will remain entertaining and stimulating over a long period of time for educational ages from kindergarten to college, since it has the attraction of virtually endless Q&A's on almost any subject matter, including trivia. FireFly ™ -Q&A's can be educationally stimulating, and demonstrates great teaching-value without a teacher or tutor; while the simplicity of the format readily adapts to all levels of learning. When played singly, FireFly ™ can maintain a high level of concentration by the operator; and when played as a contest between two or more persons, a challange is posed in seeing who can tally the most correct answers on a single Q&A-card or in a row. FireFly ™ is to be produced in two or three differently styled housing; -including one in brightly colored hi-impact plastic for the youngsters room, Another general utilitarian model in tinted transparent-plastic with a convenient carrying-handle, and still another fashioned out of handsomely veneered-wood suitable for the adult-den.

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature.

FIG. 1, is a pictorial perspective-view, favoring the frontal upper-right portion of the electric housing thereof, whereto is included a partial cut-away of the Q&A-card portion, for greater clarity;

FIG. 2, is a front-side elevation cross-sectional view thereof, as referenced arrow 2:2 in FIG. 1;

FIG. 3, is an enlarged perspective detail view of the switch region, showing occluding effect of the card and stalk members, in partial cut-away;

FIG. 4, is an alternate frontal-elevation view thereof, in partial cut-away; of the article.

IV.) ITEMIZED NOMENCLATURE REFERENCES:

10—the overall invention
11—housing bottom portion
12—housing perimeter-step
13—housing upper-perimeter edging
14,14'—housing lid, lid underside
15—perimeter-rim of lid
16,16'/16"—flat Q&A-card, turned-up for clarity (left/right)
17/17'/17"—plural Q-terminal apertures
18/18'—plural discrete Q-terminals, and circuit connections
19—dielectric panel surface
20—plural A-terminal apertures
21,21'—plural discrete A-terminals, and circuit connections
22/22',22"—left flexile conductor, undercut-slot
23—left conductor-probe
24—left conductive-tip
25/25',25"—right flexile conductor, undercut-slot
26—right conductor-probe
27—right conductive-tip
28—lid transverse-hinge
29—pilot-light
30,30'/30"—off/on switch-stalk, "on" alternates(first/second)
31,31'—stalk slide-groove, switch-body
32—"right" indicator-lamp
33—"right" audio-transducer
34—text-question indicia
35—text-answer indicia
36,36'—perimeter lip-recess, finger-relief
37,37'—9 v.-battery, battery-compartment cover
38—"off" reminder-block
39,39'/39"—switch-terminals
40/40'—Q&A-card stalk-aperatures (positions A&B)
41/41'—upper printed-circuit(top/bottom)
42/42'—lower printed-circuit(top/bottom)
43—air-space
44—file-holder

V.) DETAILED DESCRIPTION OF THE PREFERRED EMBODIMENTS

Initial reference is given by way of FIG.-1, wherein is exhibited the preferred overall parallelepiped invention housing 10 which is preferably comprised of a bottom-panel 11 formed contiguously with a perimeter-framework preferably including a perimeter-step portion 12 terminating into an upper perimeter-edge 13. Also optionally included is a rigid closing lid 14, the underside surface 14' also being viewable, along with a perpendicular perimeter-rim portion 15, and an optional transverse aftward hinge 28 guiding the lid to swing down abutting against the previously mentioned housing perimeter-step entity 12.

The planar panel face surface 19, like the rest of the housing, is preferably made of dielectric hi-impact plastic, and holds a plurality of Q (question)-terminals 18 revealed beneath the overlayed Q&A-card 16 (shown partially turned-up 16' for greater clarity) supported flatly thereon. Note here, that the Q&A-card 16 includes a matchingly aligned vertical roster plurality of aperatures 17/17'/17" and 20 precisely arranged over both the Q-terminals 18 and the A (answer)-terminals 21 respectively, all of which terminals are equidistantly spaced permanently into panel 19 in preferred rivet-stud like fashion. The Q-terminals 18 are preferably vertically aligned into two left-wardly positioned columns, with directly adjoining text-question indicia 34; while the A-terminals are preferably more closely spaced into a single vertically staggered array 20, since the adjacent text-answer indicia 35 are preferably made comparatively brief in comparison. For example, Ques.: "Who was Pres. of United States 1801-1809?". . . Ans.: Thos.-Jefferson. This particular construction thereby enabling an operator to conveniently hold one of the conductor-probes 23 and 26 in each hand, so as to thus simultaneously access both Q-terminals 18 (left hand) and A-terminals 21 (right hand) immediately underlaying Q&A-card aperature plurality 17/17'/17" and 20 respectively. Accordingly, there is no need for electrical-current to run through the contact terminals 18/18'/18" nor 21, except when the player sumultantously touches the conductor-tips 24 and 27 into common circuitry by virtue of having determined a correct combination of question & answer terminals, whereby the attendent tell-tale "right"-indicator lamp 32 illuminates, optionally along with an audio-transducer located here beneath panel aperature 33. Note also in FIG.-1 how undercut-slots 22"/25" are preferably included into the frontal perimeter 36, which enable the Q&A-cards to lay flatly against the panel surface 19, without otherwise interference from the attendant conductor-wires 22/25 respectively.

There still remain other subtle features, which are to become more evident and understood as vital provisions. Reference to FIG.-2 reveals via transverse cross-section taken along the frontal region of the electrical-housing (lid 14 in closed position) how the various components may be generally arranged. Powering the complete circuit system is preferably a 9 v.-battery 37 (end-view shown) having a conventional snap-on battery cover 37', and a battery-saver feature is also preferably included, whereby the switch-body 31' having manual slide-stalk 30 (off-position) prevents closure of the lid 14 when biased to one of it's exemplified positions 30' or 30", because the special integrally-molded "off"-reminder block 38 comes down with the preferably transparent-plastic lid 14 to impinge upon the upper end of the stalk while in positions 30'/30" only. Discovering this interference, the user is thereby immediately reminded they have inadvertantly left the switch "on", which would eventually run the battery 37 down should the left 24 and right 27 conductive-tips come into contact with each other while stowed between the lid 14' and panel 19.

Also shown, is the manner in which Q&A-card 16 (partially turned-up at 16' for added clarity) is simply indexed (laid fixed in place) upon the panel 19 preferably via its slightly recessed perimeter edging position relative to optional perimeter-edge 36 or via optional upwardly protruding extension of both Q-terminal plurality 18 and A-terminal plurality 21. To remove the Q&A-card from operating position for replacement with another card selection, a finger-relief 36' is preferably included at one or more convenient locations. Also shown, are the relative positions of the preferred printed-circuit boards. Although at least a single board conductively imprinted on both sides for discrete cross-over circuiting, will sulfice; in order to achieve substantially a more confounding contingency of Q&A-probability (that is to say, —less predictability), it is desired that both an upper 41 and a lower 42 circuit-board be included, preferably whereby the top side circuit 41' circuitively interfaces with bottom side circuit 41, and top side circuit 42' circuitively interfaces with bottom side circuit 42. Thus, with the lower switch terminals 39/39'/39" soldered into the circuitry, and the top exposed contact terminal plurality 18 and 21 also being discretely circuited, it is understood how substantially conventional circuitry procedure enables two distinctly different positions for the A-terminals 21 may be presented to the player(s); merely by manually biasing the switch-stalk 30 between exemplified positions 30' and 30". The circuitry provided for the Q-terminals 18 may remain preferably unaltered, only the A-terminals 21 really need a secondary scrambling procedure (or vice versa, only the Q-terminals 18) in order to considerably confound the player as to answer predictability; although ideally, it is preferred that three different "on"-positions actually be offered. Since the cost of printed-circuits is now generally less than that of hard-wired circuitry, little attraction is found in the considerable underboard clutter to be created by an equivalent fully hard-wire circuit; although certainly some hard wiring will be used, such as in circuiting between circuit-boards if flat ribbon-conduit is not employed.

Reference to FIGS.-2,3,4 shows how the Q&A-cards are preferably made with differently positioned stalk-apertures 40 (first "on" position) and alternate 40' (second "on" position), thereby giving at least one, and possibly two alternate "on" positional arrangements (aperture 40" required for a second-alternate scrambling of answers is not shown here to avoid visual confusion), which are to be dictated by the particular juxta-positioning of the Q&A-card stalk-aperture 40/40'. Hence, with the support panel 19 cleared prior to a play session, the player selects a Q&A-card 16 from the Fire-Fly ™/Reference-file 44 (FIG.-5), and while playing the card upon the panel 19, finds that in order to necessarily have a card 16 lay flatly upon the panel 19, the selector-switch stalk 30 must be manually biased to either "on"/position-A 30' or alternate "on"/position-B 30" as is dictated by the physical positioning of the Q&A-card indexing stalk-apertures 40 or 40' as shown in FIGS.-3&4. Thus transposing between the differently scrambled circuits-A/B is achieved rather automatically by virtue of the preferred factory determined stalk-aperature positionings. Additionally, it is preferred that the electrical panel 19 include at least one extra or supernurnerary A-terminal 21, which presence serves to still further confound the player, in as much as when the player nears the end of the Q-terminals 18 they are still confronted with a surplus of prospective answers from which to select the correct answer for a given question.

Final FIG.-5 serves to show how the Q&A-cards 16 may be held in a convenient bookshelf file-holder 44 for ready selection; plus, it is preferred that the lid underside region 14' as shown in FIG.-1 be made sufficiently ample as to accept a couple of actively deployed Q&A-cards as well.

Thus, it is readily understood how the preferred and generic-variant embodiments of this invention contemplate performing functions in a manner not heretofore available nor realized. It is implicit that the utility of the foregoing adaptions of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended Claims set out the scope of the invention sought, and are to be construed as broadly as the terminology therein employed permits; reckoning that the invention verily comprehends every use of which it is susceptible. Accordingly, the embodiments of the invention in which an exclusive property or proprietary privilege is claimed, are defined as follows.

What is claimed of proprietary inventive origin is:

1. An improved electrically operated Q&A-quiz apparatus, capable of accommodating one or more competitive players, or individually, serving as a general educational learning-aid; comprising:

an electric housing employing a conventional electrical-current powering means;

a planar upwardly facing electrical-panel supported by said housing, serving divisibly to support a roster-like plurality of question-terminals in an allocated space thereto, and a roster-like plurality of answer-terminals on an adjacent space thereto;

a normally-open electrical-circuiting means, whereby each one of said question-terminals is thus individually capable of potentially cooperating with predetermined electrical continuity to a said answer-terminal;

an electrical-circuit panel on-off switch, including a switch-stalk manual switching member extending perpendicularly from said electrical-panel, thereby enabling manual biasing of said switch from and off position to a discrete first electrical circuiting matrix, plus at least one additional alternate likewise switching position enabling biasing to at least one additional discrete alternate electrical-circuit matrix;

a pair of flexibly attached conductor-probes extending sufficiently from said housing as to enable an operator to hold a conductor-probe in each hand, simultaneously touching a left conductor-probe to a selected question-terminal, and a right conductor-probe to the choosen answer-terminal, thereby facilitating completing of said electrical circuit when a correct answer has been selected;

a variety of special Q&A-cards, each having both question and answer indicia imprinted thereon, whereby any selected Q&A-card is singly overlaid manually upon said electrical-panel, so that its plural question-apertures align over said electrical-panel's question-terminals, while its plural answer-apertures align over said electrical-panel's answer-terminals;

a special alignment aperture indexing means acting to accept passage of said switch-stalk member in only one of either said first or said alternate switch positions, thereby causing said operator to bias said switch-stalk to a passaging position before a Q&A-card can be laid into place, thereby providing a significantly increased potential number of question and answer terminal juxtapositions, thus serving to further confound an operator as to any possibly learned matching arrangements of said discrete Q&A-terminals;

a conventional indicator device means, included in said circuit, whereby selection of a correct answer becomes automatically visually or aurally announced to the operator.

2. The Q&A-apparatus according to claim 1, wherein said Q&A-card's alignment aperture indexing means is formed to fit closely around said switch-stalk; whereby different said Q&A-cards can have a differently positioned said alignment aperture, requiring said switch-stalk be manually biased into the correspondingly alligned position before said Q&A-card can be laid to rest in operating position.

3. The Q&A-apparatus according to claim 1, wherein said conventional electrical powering means is a standard d.c./storage-battery.

4. The Q&A-apparatus according to claim 1, wherein said conventional electrical powering means includes a standard step-down transformer connected to regular a.s./line-current.

5. The Q&A-apparatus according to claim 1, wherein said housing is formed with parallelepiped sides; whereby said panel's format measures approximately 6½-inches deep front-to-rear, approximately 10-inches in width, and approximately 1-inch in thickness.

6. The Q&A-apparatus according to claim 1, wherein said housing is formed with parallelepiped sides; whereby said panel's format measures approximately 8½-inches deep front-to-rear, approximately 11-inches in width, and approximately 1-inch in thickness.

7. The Q&A-apparatus according to claim 1, wherein said visual correct answer announcement is via a telltale LED-lamp, operating only while said conductor-probes are placed in electrical connection with two said commonly circuited Q&A-terminals.

8. The Q&A-apparatus according to claim 1, wherein said aural correct answer announcement is via a tell-tale audio-transducer, operating only while said conductor-probes are placed in electrical connection with two said commonly circuited Q&A-terminals.

9. The Q&A-apparatus according to claim 2, wherein said switch's electrical circuit includes and LED/pilot-lamp serving to indicate to operator that said panel Q&A-terminals and associated said conductor-probes members are ready in standby condition.

10. The Q&A-apparatus according to claim 2, wherein said electrical-circuit is constructed via well known printed-circuit methodology within said housing and beneath said panel.

11. The Q&A-apparatus according to claim 2, wherein said electrical-circuit is constructed via well known hard-wired methodology.

* * * * *